(12) United States Patent
Yan et al.

(10) Patent No.: US 12,118,004 B2
(45) Date of Patent: Oct. 15, 2024

(54) DATA AGGREGATION PROCESSING APPARATUS AND METHOD, AND STORAGE MEDIUM

(71) Applicant: YUSUR TECHNOLOGY CO., LTD., Beijing (CN)

(72) Inventors: Guihai Yan, Beijing (CN); Lutang Wang, Beijing (CN); Hongfeng Gao, Beijing (CN)

(73) Assignee: YUSUR TECHNOLOGY CO., LTD., Beijing (CN)

( * ) Notice: Subject to any disclaimer, the term of this patent is extended or adjusted under 35 U.S.C. 154(b) by 7 days.

(21) Appl. No.: 18/145,661

(22) Filed: Dec. 22, 2022

(65) Prior Publication Data
US 2023/0128085 A1 Apr. 27, 2023

Related U.S. Application Data

(63) Continuation of application No. PCT/CN2020/107192, filed on Aug. 5, 2020.

(30) Foreign Application Priority Data

Jun. 22, 2020 (CN) .......................... 202010573227.0

(51) Int. Cl.
*G06F 16/24* (2019.01)
*G06F 12/0802* (2016.01)
*G06F 16/2455* (2019.01)

(52) U.S. Cl.
CPC .... *G06F 16/24556* (2019.01); *G06F 12/0802* (2013.01); *G06F 2212/305* (2013.01)

(58) Field of Classification Search
CPC ........... G06F 16/24556; G06F 12/0802; G06F 2212/305
See application file for complete search history.

(56) References Cited

U.S. PATENT DOCUMENTS

2008/0301256 A1* 12/2008 McWilliams ....... G06F 12/0806
714/E11.178
2014/0188906 A1* 7/2014 Muller ................ G06F 16/2282
707/752

(Continued)

FOREIGN PATENT DOCUMENTS

CN 104809075 A 7/2015
CN 106250519 A 12/2016

(Continued)

OTHER PUBLICATIONS

International search report issued on Mar. 22, 2021 for counterpart PCT application No. PCT/CN2020/107192, along with the English translation (6 pages).

(Continued)

*Primary Examiner* — Eliyah S. Harper
(74) *Attorney, Agent, or Firm* — HSML P.C.

(57) ABSTRACT

The present disclosure provides a data aggregation processing apparatus and method, and a storage medium. According to the apparatus, a relatively complex target data sequence may be split, by a sequence grouping module, into a plurality of subsequences, which then can be subjected to simultaneous aggregation processing in a parallel processing mode by means of a plurality of parallel aggregation modules included in an aggregation module group, so as to obtain corresponding intermediate processing results. Subsequently, the intermediate processing results are merged by a merging module to obtain an aggregation processing result for the target data sequence. Aggregation processing for the target data sequence is completed, thus solving the technical problems in the existing methods, such as low aggregation processing efficiency and prolonged processing procedure. The technical effects of improving the aggregation process- (Continued)

ing efficiency and shortening the waiting time of users are achieved.

18 Claims, 4 Drawing Sheets

(56) References Cited

U.S. PATENT DOCUMENTS

| | | | |
|---|---|---|---|
| 2016/0350394 A1* | 12/2016 | Gaumnitz | G06F 16/2255 |
| 2017/0185649 A1* | 6/2017 | Tran | G06F 16/211 |
| 2020/0117614 A1* | 4/2020 | Zhang | G06F 9/30185 |
| 2022/0164297 A1* | 5/2022 | Sity | G06F 12/0802 |
| 2022/0342911 A1* | 10/2022 | Dhir | G06F 16/2386 |
| 2023/0128085 A1* | 4/2023 | Yan | G06F 12/0802 707/737 |
| 2023/0394041 A1* | 12/2023 | Siddiqui | G06F 16/24537 |
| 2024/0104076 A1* | 3/2024 | Casanova | G06F 16/2264 |

FOREIGN PATENT DOCUMENTS

| | | |
|---|---|---|
| CN | 106598494 A | 4/2017 |
| CN | 109145051 A | 1/2019 |
| CN | 110362763 A | 10/2019 |
| CN | 110442574 A | 11/2019 |
| JP | 2003140932 A | 5/2003 |

OTHER PUBLICATIONS

First Office Action, periodicals and search report issued on May 13, 2021 for counterpart Chinese patent application No. 202010573227.0, along with the English translation (20 pages).

Second Office Action, periodicals and search report issued on Aug. 17, 2021 for counterpart Chinese patent application No. 202010573227.0, along with the English translation (19 pages).

Supplementary search report on May 7, 2021 for counterpart Chinese patent application No. 202010573227.0, along with the English translation (5 pages).

\* cited by examiner

DATA AGGREGATION PROCESSING APPARATUS AND METHOD, AND STORAGE MEDIUM

This application is a continuation of International Application No. PCT/CN2020/107192, filed on Aug. 5, 2020, which claims priority to Chinese Patent Application No. 202010573227.0 filed on Jun. 22, 2020, both of which are hereby incorporated by reference in their entireties.

TECHNICAL FIELD

The present disclosure belongs to the field of database processing technologies, and relates more particularly to a data aggregation processing apparatus and method, and a storage medium.

BACKGROUND

As technologies advance, the amount of data contained in a database is continuously rising. Accordingly, for a server that responds to a user's query request for the database, it takes much longer time to aggregate (or operate) the data in the database. Thus, in general, only after a long wait can the user obtain the aggregation processing result fed back from the server.

Therefore, a need exists for a method that can efficiently perform aggregation processing on the data in the database.

SUMMARY

The present disclosure provides a data aggregation processing apparatus and method, and a storage medium, in order to improve the aggregation processing efficiency, and to solve the technical problems in the existing methods, such as low aggregation processing efficiency and prolonged processing procedure.

The data aggregation processing apparatus and method, and the storage medium according to the present disclosure are implemented as follows.

A data aggregation processing apparatus includes a sequence grouping module, an aggregation module group, and a merging module, wherein the sequence grouping module is connected with the aggregation module group, and the merging module is connected with the aggregation module group;

the sequence grouping module is configured to divide a target data sequence in an accessed database into a plurality of subsequence groups, so as to obtain a plurality of subsequences; wherein the target data sequence includes a plurality of data elements;

the aggregation module group includes a plurality of parallel aggregation modules, the aggregation module group is configured to acquire the plurality of subsequences, and perform parallel aggregation processing on the plurality of subsequences through the plurality of parallel aggregation modules, so as to obtain corresponding intermediate processing results for the plurality of subsequences;

the merging module is configured to merge the intermediate processing results, so as to obtain an aggregation processing result for the target data sequence.

In an embodiment, a subsequence caching module is further connected between the aggregation module group and the sequence grouping module, and the subsequence caching module is configured to cache the plurality of subsequences.

In an embodiment, the subsequence caching module includes an on-chip memory, and the subsequence caching module caches the plurality of subsequences in the on-chip memory.

In an embodiment, the subsequence caching module further includes a DDR memory and/or an SSD memory, and in case that the storage space of the on-chip memory does not satisfy storage requirements, the subsequence caching module caches the plurality of subsequences in the DDR memory and/or the SSD memory.

In an embodiment, an intermediate processing result caching module is further connected between the merging module and the aggregation module group, and the intermediate processing result caching module is configured to cache a plurality of intermediate processing results.

In an embodiment, the intermediate processing result caching module includes an on-chip memory, and the intermediate processing result caching module caches the plurality of intermediate processing results in the on-chip memory.

In an embodiment, a subsequence grouping module group is further connected between the aggregation module group and the sequence grouping module, wherein the subsequence grouping module group includes a plurality of subsequence grouping modules, the plurality of subsequence grouping modules are configured to group the data elements contained in various subsequences in the plurality of subsequences, and split the subsequences in the plurality of subsequences into a plurality of unit subsequences, respectively.

In an embodiment, the aggregation module includes a plurality of logic operation units, and the plurality of logic operation units include at least one of: an adding unit, a dividing unit, and a comparing unit.

In an embodiment, the apparatus further includes a configuration port, which is connected with the aggregation modules in the aggregation module group and configured to receive mode configuration parameters for aggregation processing set by a user.

In an embodiment, the module is configured to combine the plurality of logic operation units according to the mode configuration parameters, in order to perform aggregation processing of corresponding mode types on the subsequences.

In an embodiment, the mode types for aggregation processing include at least one of: summing, averaging, minimizing, and maximizing.

The present application also provides a data aggregation processing method, including:
  acquiring a target data sequence in a database, wherein the target data sequence includes a plurality of data elements;
  dividing the plurality of data elements in the target data sequence into a plurality of subsequence groups, so as to obtain a plurality of subsequences;
  performing parallel aggregation processing on the plurality of subsequences, so as to obtain a plurality of intermediate processing results for the subsequences; and
  merging the intermediate processing results, so as to obtain an aggregation processing result for the target data sequence.

In an embodiment, dividing the plurality of data elements in the target data sequence into a plurality of subsequence groups so as to obtain a plurality of subsequences includes:
  determining attribute flags for various data elements in the plurality of data elements;

taking the attribute flags as grouping flags, and determining, based on the grouping flags for the data elements, subsequence groups corresponding respectively to various data elements in the plurality of data elements; and establishing corresponding subsequences according to the data elements contained in various subsequence groups.

In an embodiment, the method further includes:

receiving, via a configuration port, mode configuration parameters for aggregation processing set by a user; and determining, based on the mode configuration parameters for aggregation processing, mode types for aggregation processing.

In an embodiment, the mode types for aggregation processing include at least one of: summing, averaging, minimizing, and maximizing.

In an embodiment, the method, after dividing the plurality of data elements in the target data sequence into a plurality of subsequence groups so as to obtain a plurality of subsequences, further includes:

determining a number of data elements contained in various subsequences in the plurality of subsequences; and determining, based on the number of data elements contained in various subsequences in the plurality of subsequences, whether the subsequences in the plurality of subsequences need to be grouped.

In an embodiment, the method, in case of determining, based on the number of data elements contained in various subsequences in the plurality of subsequences, that the subsequences in the plurality of subsequences need to be grouped, further includes:

splitting the subsequences in the plurality of subsequences into a plurality of unit subsequences, respectively, by grouping the data elements contained in various subsequences in the plurality of subsequences;

and accordingly, performing parallel aggregation processing on the plurality of subsequences so as to obtain a plurality of intermediate processing results for the subsequences includes:

performing parallel aggregation processing on the plurality of unit subsequences, respectively, so as to obtain aggregation processing results for the unit subsequences; and aggregating the aggregation processing results for the unit subsequences corresponding to a same subsequence, so as to obtain an intermediate processing result for the subsequence.

In an embodiment, the method further includes:

storing the plurality of subsequences on an on-chip memory.

In an embodiment, in case that the storage space of the on-chip memory does not satisfy storage requirements, the plurality of subsequences are stored on a DDR memory, or an SSD memory.

In an embodiment, acquiring a target data sequence in a database includes:

receiving a data query request for the database made by a user; and acquiring, from the database, the target data sequence associated with the data query request according to the data query request.

Embodiments of the present application also provide a computer readable storage medium having computer instructions stored thereon that, when executed, implement acquisition of the target data sequence in the database, wherein the target data sequence includes a plurality of data elements; the plurality of data elements in the target data sequence are divided into a plurality of subsequence groups, so as to obtain a plurality of subsequences; parallel aggregation processing is performed on the plurality of subsequences, so as to obtain a plurality of intermediate processing results for the subsequences; and the intermediate processing results are merged, so as to obtain an aggregation processing result for the target data sequence.

According to the data aggregation processing apparatus and method, and the storage medium in the present disclosure, a relatively complex target data sequence is split into a plurality of subsequences, which then can be subjected to simultaneous aggregation processing in a parallel processing mode, so as to obtain corresponding intermediate processing results. Subsequently, the intermediate processing results are merged to obtain an aggregation processing result for the target data sequence. Aggregation processing for the target data sequence is completed, thus solving the technical problems in the existing methods, such as low aggregation processing efficiency and prolonged processing procedure. The technical effects of increasing the aggregation processing efficiency, shortening the waiting time for users to query or access a database, and improving user experience are achieved.

BRIEF DESCRIPTION OF DRAWINGS

In order to more clearly illustrate the embodiments of the present disclosure, the accompanying drawings required to be used in the embodiments will be briefly introduced below. The accompanying drawings in the following description show merely some embodiments recited in this specification, and persons of ordinary skill in the art may still derive other drawings from these accompanying drawings without creative efforts.

DESCRIPTION OF EMBODIMENTS

Figure 1:
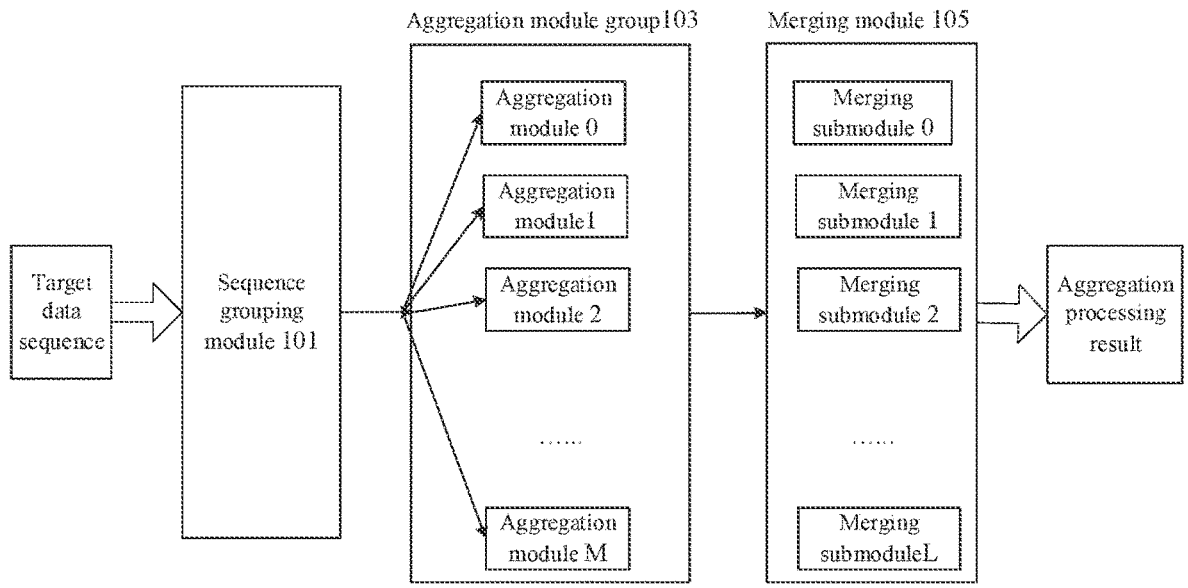
FIG. 1 is a schematic structural composition diagram of a data aggregation processing apparatus according to an embodiment of the present disclosure.

In order to enable those skilled in the art to better understand the technical solutions in this specification, the technical solutions in the embodiments of the present disclosure are described clearly and thoroughly below in combination with the accompanying drawings in the embodiments of the present disclosure. Apparently, the embodiments described are only a part of the embodiments in this specification, rather than all the embodiments. Based on the embodiments in this specification, all other embodiments attained by those ordinary skilled in the art without creative efforts shall fall within the scope of protection of this specification.

In general, when a server performs aggregation operations on a data sequence in a database, data elements in this data sequence are typically subjected to aggregation processing one by one in a serial processing mode. With the development of big data and other such technologies, the amount of data contained in the database is continuously rising. As a consequence, the data sequence on which the server performs aggregation operations also becomes increasingly complex. For instance, the data sequence on which the server typically performs aggregation operations may contain hundreds of thousands of data elements. As for the relatively complex data sequence described above, usage of a serial processing mode while processing could typically lead to prolonged processing procedure, as a result of which more severe time delay will arise, and only after a long wait can the user obtain the aggregation processing result. As can be seen from above, the technical problems, such as low aggregation processing efficiency, prolonged processing, long waiting time for users, and poor user experience, will occur if the relatively complex data sequence is subjected to aggregation processing on the basis of the existing methods.

In view of the root causes for the above problems, what is taken into consideration in the present disclosure is that the relatively complex target data sequence can be split in a grouping manner into a plurality of relatively simple subsequences, which then, on the basis that the processing performance of a processor is fully utilized, can be subjected to simultaneous aggregation processing in a parallel processing mode, so as to obtain corresponding intermediate processing results. Further, by using a merging way, the above intermediate processing results are merged to obtain an aggregation processing result for the full target data sequence, so aggregation processing for the target data sequence is completed. In this way, the technical problems in the existing methods, such as low aggregation processing efficiency, prolonged processing, long waiting time for users, and poor user experience, can be effectively solved, and the technical effects of increasing the aggregation processing efficiency, shortening the waiting time for users to query or access a database, and improving user experience are achieved.

Based on the above-mentioned idea, the embodiments of the present application provide a data aggregation processing apparatus. In particular, reference shall be made to a schematic structural composition diagram of the data aggregation processing apparatus according to an embodiment of the present disclosure, as illustrated in FIG. 1. In particular, this apparatus may include: structural modules such as a sequence grouping module 101, an aggregation module group 103, and a merging module 105, wherein the sequence grouping module 101 is connected with the aggregation module group 103, and the merging module 105 is connected with the aggregation module group 103.

In particular, the above aggregation module group 103 may further include a plurality of aggregation modules, e.g., aggregation module 0, aggregation module 1 . . . aggregation module M, etc. The plurality of aggregation modules mentioned above are in parallel connection with each other to form the aggregation module group 103, wherein data processing among the plurality of aggregation modules is independent of one another.

In particular, the above sequence grouping module 101, during specific implementation, may be configured to divide a target data sequence in an accessed database into a plurality of subsequence groups, so as to obtain a plurality of subsequences; wherein the target data sequence includes a plurality of data elements.

In particular, the above target data sequence may be a data sequence a user wants to query in the database, or a data sequence that is input from the outside or input through an on-chip cache.

The above sequence grouping module 101, during specific implementation, may: at first determine attribute flags for various data elements in the plurality of data elements contained in the target data sequence; then, take the attribute flags as grouping flags, and determine, based on the grouping flags for the data elements, subsequence groups corresponding respectively to various data elements in the plurality of data elements; and further establish corresponding subsequences according to the data elements contained in various subsequence groups.

The aggregation module group 103 may in particular include a plurality of parallel aggregation modules, which are configured to acquire a plurality of subsequences from the sequence grouping module 101, and to perform parallel aggregation processing on the plurality of subsequences through the plurality of parallel aggregation modules, respectively, so as to obtain corresponding intermediate processing results for the plurality of subsequences.

After obtaining the plurality of subsequences output by the grouping module 101, the above aggregation module group 103 allocates the above plurality of subsequences to the plurality of aggregation modules, respectively, for processing purposes. At the time of the allocation, the plurality of subsequences may be allocated batchwise to the plurality of aggregation modules for processing purposes, if the number of the plurality of subsequences to be processed is greater than the number of the plurality of aggregation modules.

The above merging module 105, during specific implementation, may be configured to merge the intermediate processing results, so as to obtain an aggregation processing result for the target data sequence.

In particular, the above merging module 105 may include a plurality of parallel merging submodules. For example, the merging module 105 may include parallel merging submodule 0, merging submodule 1 . . . merging submodule L. In this way, the merging module 105, when merging the plurality of intermediate processing results, may call the plurality of merging submodules included, to acquire two intermediate processing results, respectively, with an aim of realizing merging of every two intermediate processing results. One total merging result is finally output as the aggregation processing result for the target data sequence. Thus, the processing efficiency can be further increased by merging in a parallel processing mode.

In this embodiment, during specific implementation, the above apparatus, when performing aggregation processing on a relatively complex target data sequence containing a larger number of data elements, may be utilized to divide the above relatively complex target data sequence into a plurality of relatively simple subsequences containing a smaller number of data elements, by means of the sequence grouping module 101. Further, the plurality of subsequences output by the above sequence grouping module 101 are allocated by the aggregation module group 103 respectively to the plurality of parallel aggregation modules included. Then, in a parallel processing mode, the plurality of parallel aggregation modules may perform simultaneous aggregation processing respectively on the plurality of subsequences allocated thereto, so as to obtain a plurality of intermediate processing results corresponding to the subsequences. The above plurality of intermediate processing results corresponding to the subsequences are then merged by the merging module 105, so as to obtain the aggregation processing result for the target data sequence.

With the above apparatus, a relatively complex target data sequence can be split into a plurality of subsequences, which then can be subjected to simultaneous aggregation processing in a parallel processing mode, so as to obtain corresponding intermediate processing results. Subsequently, the intermediate processing results are merged to obtain an aggregation processing result for the target data sequence. Aggregation processing for the target data sequence is completed, thus solving the technical problems in the existing methods, such as low aggregation processing efficiency and prolonged processing procedure. The technical effects of increasing the aggregation processing efficiency, shortening the waiting time for users to query or access a database, and improving user experience are achieved.

Figure 2:
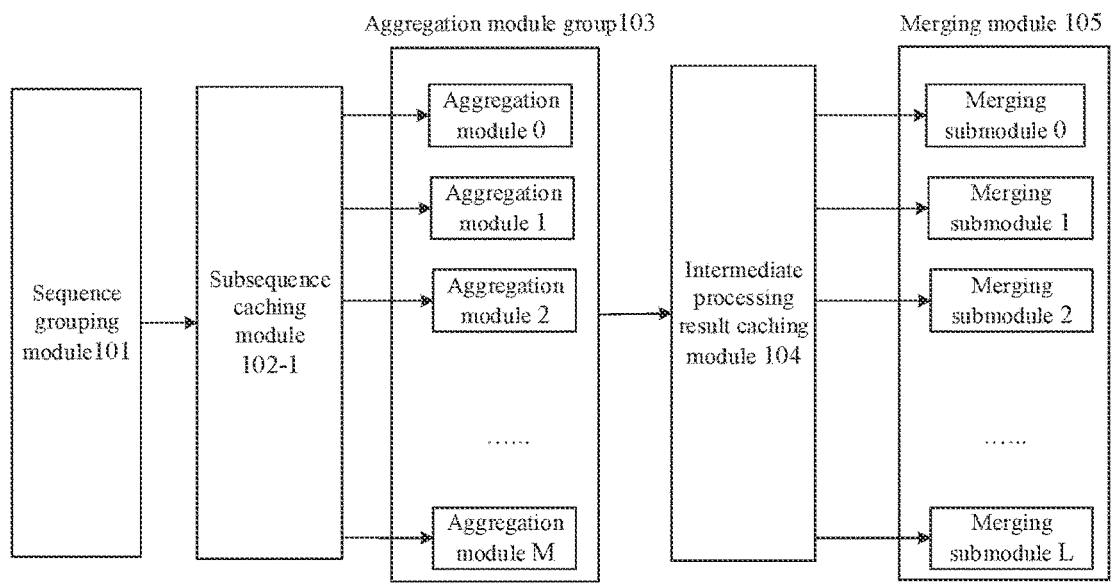
FIG. 2 is a schematic structural composition diagram of the data aggregation processing apparatus according to another embodiment of the present disclosure.

In an embodiment, as shown in FIG. 2, a subsequence caching module 102-1 may further be connected between the aggregation module group 103 and the sequence grouping module 101, wherein the subsequence caching module 102-1 may in particular be configured to cache the plurality of subsequences.

During specific implementation, the plurality of subsequences that are obtained from grouping by the sequence grouping module 101 may be initially cached by the subsequence caching module 102-1. The aggregation module group 103, when processing the subsequences, may read the plurality of subsequences from the cache, and allocate the plurality of subsequences to the plurality of aggregation modules for processing purposes.

In an embodiment, the subsequence caching module 102-1 may in particular include an on-chip memory, and the subsequence caching module 102-1 may cache the plurality of subsequences in the on-chip memory.

During specific implementation, in case that the storage space of the on-chip memory satisfies the storage requirements, the subsequence caching module 102-1 may preferably cache the above plurality of subsequences in the on-chip memory, which may effectively increase the efficiency that the aggregation module group 103 reads the plurality of subsequences, and also improve the overall processing efficiency.

In an embodiment, the subsequence caching module 102-1 may in particular further include a DDR memory and/or an SSD memory, and in case that the storage space of the on-chip memory does not satisfy storage requirements, the subsequence caching module 102-1 may cache the plurality of subsequences in the DDR memory and/or the SSD memory. In this way, in case of insufficient storage space of the on-chip memory, the subsequence caching module 102-1 may cache the plurality of subsequences in an off-chip memory such as DDR memory and/or SSD memory, and the aggregation module group 103 may obtain the plurality of subsequences by reading the same from the above DDR memory and/or SSD memory.

In an embodiment, as shown in FIG. 2, an intermediate processing result caching module 104 may further be connected between the merging module 105 and the aggregation module group 103, and the intermediate processing result caching module 104 may in particular be configured to cache a plurality of intermediate processing results.

During specific implementation, the plurality of intermediate processing results that are obtained from parallel aggregation processing by the aggregation module group 103 may be initially cached by the intermediate processing result caching module 104. The merging module 105, when merging the intermediate processing results, may read from the cache, and then merge, the plurality of intermediate processing results.

In an embodiment, the intermediate processing result caching module 104 may in particular include an on-chip memory, and the intermediate processing result caching module 104, during specific implementation, may cache the plurality of intermediate processing results in the on-chip memory.

During specific implementation, in case that the storage space of the on-chip memory satisfies the storage requirements, the intermediate processing result caching module 104 may preferably cache the above plurality of intermediate processing results in the on-chip memory, which may effectively increase the efficiency that the merging module 105 reads the plurality of intermediate processing results, and therefore improve the overall processing efficiency.

In an embodiment, the intermediate processing result caching module 104 may in particular further include a DDR memory and/or an SSD memory, and in case that the storage space of the on-chip memory does not satisfy storage requirements, the intermediate processing result caching module 104 may cache the plurality of intermediate processing results in the DDR memory and/or the SSD memory. In this way, in case of insufficient storage space of the on-chip memory, the intermediate processing result caching module 104 may cache the plurality of intermediate processing results in an off-chip memory such as DDR memory and/or SSD memory, and the merging module 105 may obtain the plurality of intermediate processing results by reading the same from the above DDR memory and/or SSD memory.

Figure 3:
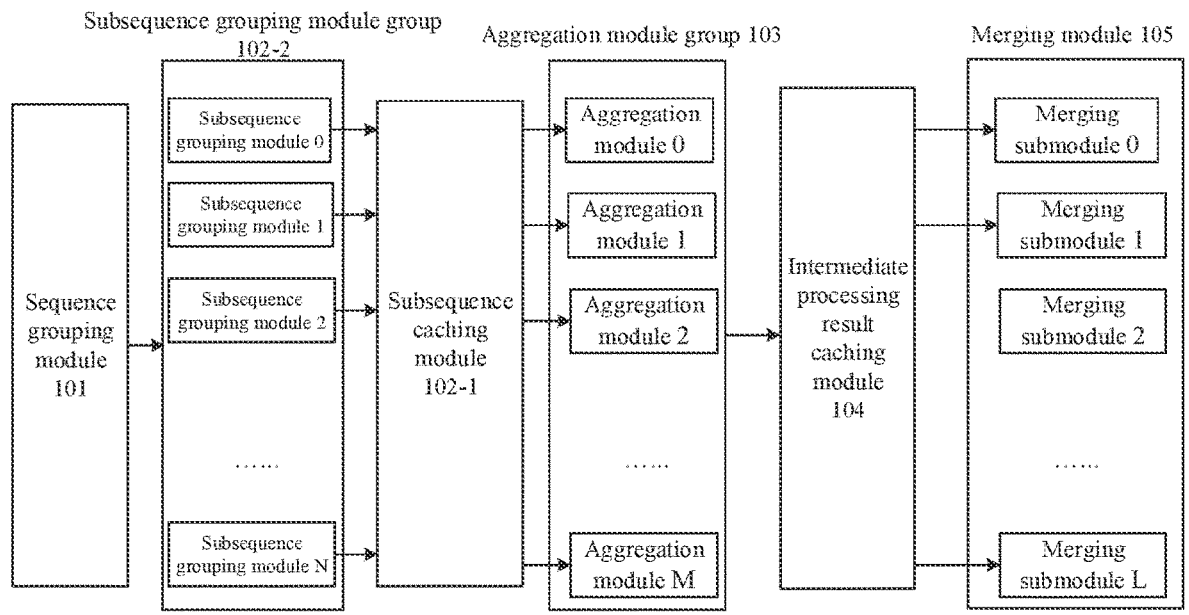
FIG. 3 is a schematic structural composition diagram of the data aggregation processing apparatus according to yet another embodiment of the present disclosure.

In an embodiment, as shown in FIG. 3, a subsequence grouping module group 102-2 may in particular further be connected between the aggregation module group 103 and the sequence grouping module 101, wherein the subsequence grouping module group 102-2 may in particular include a plurality of subsequence grouping modules, e.g., subsequence grouping module 0, subsequence grouping module 1 . . . subsequence grouping module N, etc. The plurality of subsequence grouping modules may in particular be configured to further group the data elements contained in various subsequences in the plurality of subsequences, and split the subsequences in the plurality of subsequences into a plurality of unit subsequences, respectively.

In this embodiment, given that the plurality of subsequences that are obtained from division by the sequence grouping module 101 may still contain a relatively larger number of data elements, there is still relatively complex aggregation processing performed by the aggregation modules in the aggregation module group 103. At this time, the plurality of subsequences may be further split by the plurality of subsequence grouping modules in the above subsequence grouping module group 102-2, so as to obtain a plurality of unit subsequences that contain a smaller number of data elements and that are also relatively simpler. Accordingly, the plurality of aggregation modules in the aggregation module group 103 may subsequently perform parallel aggregation processing on the plurality of unit subsequences, respectively, so as to obtain aggregation processing results for the unit subsequences; and then aggregate the aggregation processing results for the unit subsequences corresponding to a same subsequence, so as to obtain an intermediate processing result for the subsequence. Doing so can reduce the complexity of aggregation processing by the aggregation module group 103 and further increase the processing efficiency.

Figure 4:
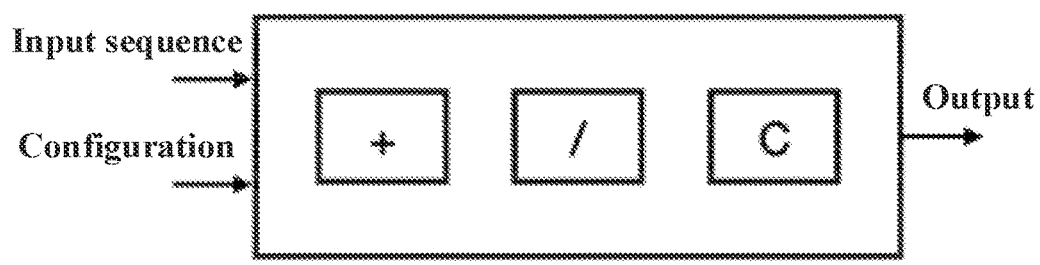
FIG. 4 is a schematic structural composition diagram of an aggregation module in the data aggregation processing apparatus according to an embodiment of the present disclosure.

In some embodiments, as shown in FIG. 4, the aggregation module may in particular include a plurality of different logic operation units, wherein the plurality of logic operation units may in particular include at least one of: an adding unit, a dividing unit, and a comparing unit, etc. Undoubtedly, the logical operation units listed above are only a schematic illustration. During specific implementation, logic operation units of other types than the above-listed logic operation units may also be included, depending on specific application scenarios and processing requirements. This is not limited in this specification.

In an embodiment, the aggregation module may achieve aggregation processing of corresponding mode types on the subsequences, by combining the plurality of selected logic operation units.

In an embodiment, the mode types for aggregation processing may in particular include at least one of: summing, averaging, minimizing, and maximizing, etc. Undoubtedly, the mode types listed above are only a schematic illustration. During specific implementation, aggregation processing of other mode types may also be included, depending on specific application scenarios and processing requirements. This is not limited in this specification.

In an embodiment, the apparatus may in particular further include a configuration port, wherein the configuration port may in particular be connected with the aggregation modules in the aggregation module group, and in particular configured to receive mode configuration parameters for aggregation processing set by a user. The user may set, via the configuration port, the corresponding mode configuration parameters for configuration setting of the aggregation modules, thereby controlling the aggregation modules to perform aggregation processing of the corresponding mode types on the subsequences.

In an embodiment, the module may in particular be configured to select and combine the plurality of corresponding logic operation units according to the mode configuration parameters, such that aggregation processing of the corresponding mode types may be performed on the subsequences by the above logic unit combination. Thus, aggregation processing that satisfies user's requirements can be realized.

It is to be noted that the unit, apparatus, module, etc. illustrated in the above embodiments may be specifically implemented by a computer chip or an entity, or by a product having a certain function. For ease of description, when the above apparatus is described, it is divided into various modules in terms of functions for respective descriptions. Definitely, when the embodiments of this specification are implemented, the functions of various modules may be implemented in same or multiple pieces of software and/or hardware, or the modules that implement the same function may also be implemented through combinations of a plurality of submodules or subunits. The apparatus embodiment described above is merely exemplary. For example, the division of said units is only a logical function division, and there may be other divisions in actual implementation, e.g., multiple units or components may be combined or may be integrated to another system, or some features may be omitted, or not implemented. In addition, the shown or discussed mutual coupling or direct coupling or communication connection may be indirect coupling or communication connection through some interfaces, apparatuses or units, and may be in electrical, mechanical, or other forms.

It is thus clear from above that in the data aggregation processing apparatus according to the embodiments of the present disclosure, a relatively complex target data sequence may be split, by the sequence grouping module, into a plurality of subsequences, which then can be subjected to simultaneous aggregation processing in a parallel processing mode by means of a plurality of parallel aggregation modules included in the aggregation module group, so as to obtain corresponding intermediate processing results. Subsequently, the intermediate processing results are merged by the merging module to obtain an aggregation processing result for the target data sequence. Aggregation processing for the target data sequence is completed, thus solving the technical problems in the existing methods, such as low aggregation processing efficiency and prolonged processing procedure. The technical effects of increasing the aggregation processing efficiency, shortening the waiting time for users to query or access a database, and improving user experience are achieved.

Figure 5:
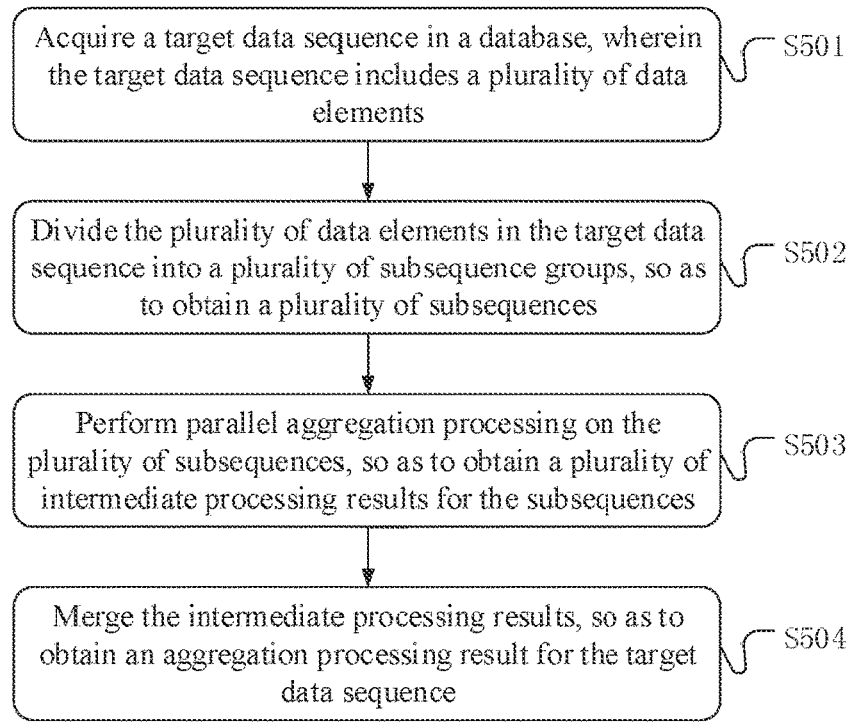
FIG. 5 is a schematic flowchart of a data aggregation processing method according to an embodiment of the present disclosure.

The embodiments of the present application also provide a data aggregation processing method. In particular, reference shall be made to a schematic flowchart of the data aggregation processing method according to an embodiment of the present disclosure, as shown in FIG. 5. The data aggregation processing method according to the embodiments of the present application, during specific implementation, may include the followings.

S501: acquiring a target data sequence in a database, wherein the target data sequence includes a plurality of data elements.

In this embodiment, the above data aggregation processing method may be in particular applied to a server that is responsible for aggregation operation processing of the data in the database. The above server may in particular include a server that is applied to the business platform side, can implement functions such as data transmission, data processing and the like, and is responsible for data processing. In particular, said server may, for example, be an electronic device having data operation, storage functions as well as network interaction functions. Alternatively, said server may also be a software program that runs in this electronic device and provides support for data processing, storage and network interaction. It is to be noted that the number of said servers is not explicitly limited in this embodiment. In particular, said server may be one server, or several servers, or a server cluster composed of a few servers.

Figure 6:
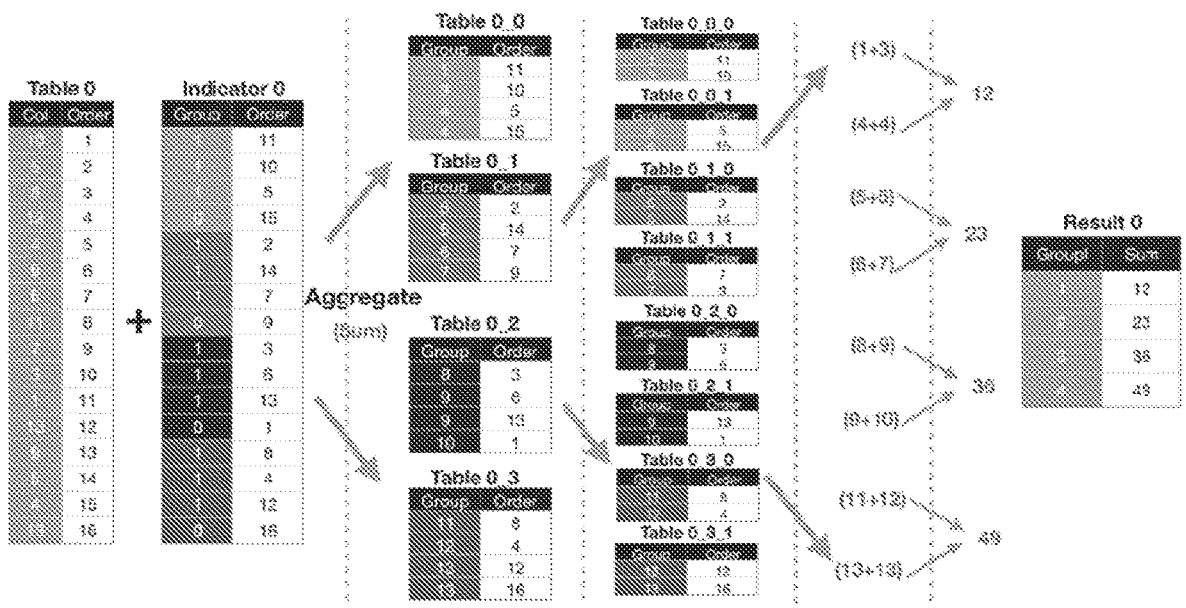
FIG. 6 is a schematic diagram of an embodiment in which the data aggregation processing method according to the embodiments of the present disclosure is applied in a scenario example.

In an embodiment, the above target data sequence may in particular include a data sequence that is stored in the database and contains information content a user wants to query and access, wherein the above target data sequence may include a plurality of data elements. Reference shall be made to FIG. 6 for further details. In a target data sequence Table0, each data element may in particular contain a data value (which may be denoted as Col) for this data element, as well as a number (which may be denoted as Order) of this data element in this data sequence.

In an embodiment, the above target data sequence may in particular be used to characterize different business contents, depending on different business scenarios. Accordingly, the specific data value for each data element in the above target data sequence may be a data value used to characterize the corresponding business content.

For example, in a business scenario where Employee A queries his/her salary, the above target data sequence may in particular be data stored in the database and used to characterize the specific salary of Employee A. Each data element in the above target data sequence may in particular correspond to one salary item in this employee's salary, which characterizes the amount Employee A receives in terms of this salary item. For example, the data element numbered 1 in the target data sequence may be the basic salary item corresponding to Employee A, and the data value 3000 for this data element may be used to indicate that the amount of basic salary for Employee A is 3000 yuan, etc. Undoubtedly, the target data sequence listed above is only a schematic illustration. During specific implementation, the above target data sequence may also be a data sequence used to characterize other business contents, depending on specific application scenarios and processing requirements. This is not limited in this specification.

In an embodiment, the above acquiring a target data sequence in a database, during specific implementation, may include: receiving a data query request for the database made by a user; and acquiring, from the database, the target data sequence associated with the data query request according to the data query request.

In this embodiment, if the user wants to query or access a particular database to acquire corresponding information content, a corresponding data query request for the database may be generated through a client device, e.g., a mobile phone, a computer and other such devices used by the user, and then sent to the server, wherein the above query request may in particular carry indicating information for the information content that this user wants to query and acquire.

Upon reception of the above query request, the server may first analyze this query request to acquire the carried indicating information for the information content that this user wants to query and acquire, then search, according to the above indicating information, the database for which the query request is destined, and find in the database a data sequence matched and associated with this query request and containing the information content that the user wants to acquire, as the target data sequence.

S502: dividing the plurality of data elements in the target data sequence into a plurality of subsequence groups, so as to obtain a plurality of subsequences.

In this embodiment, given that the target data sequence itself is relatively complex and contains a large number of data elements, processing in a serial processing mode will inevitably consume much more processing time. To achieve a compatibility with the parallel processing mode while processing, the initially relatively complex target data sequence may be split into a plurality of relatively simple subsequences that contain a relatively smaller number of data elements.

In an embodiment, in view of the fact that the target data sequence stored in the database typically further includes mark or flag information used to characterize the attributes of the data elements, what may be taken into consideration is that the plurality of data elements in the target data sequence is divided into different subsequence groups by acquiring attribute flags for the data elements in the target data sequence and taking these attribute flags as a basis for grouping, so as to obtain a plurality of corresponding subsequences.

During specific implementation, the attribute flags for various data elements in the plurality of data elements may be determined; the attribute flags are taken as grouping flags, and based on the grouping flags for the data elements, subsequence groups corresponding respectively to various data elements in the plurality of data elements are determined; and corresponding subsequences are established according to the data elements contained in various subsequence groups.

In this embodiment, during specific implementation, a plurality of data elements divided into one subsequence group may be combined according to the numbers of the data elements in the target data sequence, so as to establish the subsequences corresponding to this subsequence group.

In an embodiment, the above attribute flag may in particular include one or more combinations of the followings: gender attribute flag, level attribute flag, business type attribute flag, etc. Undoubtedly, the attribute flags listed above are merely a schematic illustration. During specific implementation, other appropriate attribute flags may also be introduced, depending on specific business scenarios. This is not limited in this specification.

In an embodiment, it is also possible that the server additionally sets the corresponding attribute flags, as the grouping flags, for various data elements according to the attributes of the data elements in the target data sequence. Also, the server may randomly set a number, as the grouping flags, for various data elements according to the processing performance for a single subsequence, and ensure that the number of the grouping flags corresponding to each subsequence is identical and that the processing performance for a single subsequence is satisfied.

Undoubtedly, it is to be noted that the above-listed way of splitting the target data sequence into a plurality of subsequences is merely a schematic illustration. During specific implementation, other appropriate splitting ways may also be employed to split the target data sequence into a plurality of subsequences, depending on specific situations. This is not limited in this specification.

In an embodiment, the subsequence that results from the above splitting way sometimes may still be complex and may contain a large number of data elements, or the server-based processing performance still fails to effectively process this single subsequence, in which case the server may further split and group the above subsequence obtained by splitting, so as to obtain a relatively simpler processing structure.

In particular, after dividing the plurality of data elements in the target data sequence into a plurality of subsequence groups so as to obtain a plurality of subsequences, the method may further include: determining a number of data elements contained in various subsequences in the plurality of subsequences; and determining, based on the number of data elements contained in various subsequences in the plurality of subsequences, whether the subsequences in the plurality of subsequences need to be grouped.

If the number of data elements contained in the subsequence is relatively large and is greater than a preset threshold number, this subsequence may be grouped, in order to split this subsequence into relatively simpler unit subsequences that contain a relatively smaller number of data elements.

For example, the subsequences in the plurality of subsequences may be split into a plurality of unit subsequences, respectively, by grouping the data elements contained in various subsequences in the plurality of subsequences. At the time of subsequence processing, parallel processing may be performed in units of the unit subsequences.

In an embodiment, after dividing the plurality of data elements in the target data sequence into a plurality of subsequence groups so as to obtain a plurality of subsequences, further, the server may also initially store the plurality of subsequences on the on-chip memory in a caching mode. This could facilitate subsequent subsequences reading, raise the reading efficiency, and further improve the overall processing efficiency.

In an embodiment, given that the storage space of the on-chip memory may be relatively limited, the server will also detect the space of the on-chip memory when the subsequences are stored, in order to determine whether or not the storage space of the on-chip memory satisfies storage requirements.

In case that the storage space of the on-chip memory satisfies storage requirements, higher priority may be given to storing the plurality of subsequences on the on-chip memory. In case that the storage space of the on-chip memory does not satisfy storage requirements, the plurality of subsequences are stored on the DDR memory or the SSD memory.

S503: performing parallel aggregation processing on the plurality of subsequences, so as to obtain a plurality of intermediate processing results for the subsequences.

In this embodiment, the above aggregation processing may also be termed as aggregation operation, and may be construed as a specific operation that is performed on the data elements in the target data sequence according to data values for the data elements in the target data sequence.

In an embodiment, for different business scenarios and processing requirements, the above aggregation processing may be aggregation processing of different mode types. In particular, the mode types for the above aggregation processing may include at least one of: summing, averaging, minimizing, and maximizing, etc. Undoubtedly, the above-listed mode types for aggregation processing are merely a schematic illustration. During specific implementation, other appropriate mode types for aggregation processing may also be introduced, depending on specific business scenarios. This is not limited in this specification. In this embodiment, a specific description is given with the mode type for aggregation processing being summing. For the implementation of other mode types for aggregation processing, reference shall be made to summing, and no repeated description is given in this specification.

In an embodiment, during specific implementation, the server, before performing aggregation processing on the plurality of subsequences, may also receive, via a configuration port, mode configuration parameters for aggregation processing set by a user; and determine, based on the mode configuration parameters for aggregation processing, mode types for aggregation processing. The above mode configuration parameters may in particular be used to characterize the mode type for aggregation processing that is selected by the user.

In an embodiment, during specific implementation, instead of acquiring the mode configuration parameters set by the user, a corresponding and matched mode type for aggregation processing is selected as a default mode type in accordance with data features of the to-be-processed target data sequence itself, such that the plurality of subsequences may be directly subjected to aggregation processing of the default mode type.

In an embodiment, the server may perform simultaneous parallel aggregation processing on the above plurality of subsequences in a parallel processing mode. Thus, the duration for aggregation processing of the target data sequence may be reduced in an effective way.

In an embodiment, during specific implementation, the server may allocate the above plurality of subsequences to different processing units (e.g., different aggregation modules), respectively, such that the different processing units may be controlled to read the allocated subsequences respectively from the memory and then to perform simultaneous aggregation processing on the read subsequences, so as to obtain corresponding intermediate processing results. As a result, parallel processing for the plurality of subsequences is achieved.

In particular, the above intermediate processing results may be construed as aggregation processing results that are obtained after aggregation processing is performed on a single subsequence. For example, in case that the mode type for aggregation processing is summing, the above intermediate processing results may be a sum obtained by adding the data values for the data elements contained in one subsequence.

In an embodiment, if the number of the subsequences to be processed is relatively large and also exceeds the number of allocatable processing units, then a plurality of subsequences may be allocated batchwise to a plurality of processing units, and the processing units may be controlled to perform parallel aggregation processing multiple times, to finish parallel processing for all the subsequences.

In an embodiment, if the data elements contained in various subsequences in the plurality of subsequences are also grouped before, then the subsequences in the plurality of subsequences are split into a plurality of unit subsequences. Accordingly, the above performing parallel aggregation processing on the plurality of subsequences so as to obtain a plurality of intermediate processing results for the subsequences, during specific implementation, may include: performing parallel aggregation processing on the plurality of unit subsequences, respectively, so as to obtain aggregation processing results for the unit subsequences. Further, the aggregation processing results for the unit subsequences corresponding to a same subsequence are then merged, so as to obtain an intermediate processing result for the subsequence.

In particular, reference may be made to FIG. 6, the target data sequence is initially divided into 4 subsequences, which are denoted as: Table0_0, Table0_1, Table0_2, and Table0_3. Further, various subsequences in the above 4 subsequences are then respectively grouped and split into 2 simpler unit subsequences, so as to obtain 8 different unit subsequences, which are denoted respectively as: Table0_0_0, Table0_0_1, Table0_1_0, Table0_1_1, Table0_2_0, Table0_2_1, Table0_3_0, and Table0_3_1. At this time, the server may allocate the unit subsequences to different processing units, and control the plurality of processing units to perform parallel aggregation processing on the plurality of unit subsequences at the same time, so as to obtain corresponding aggregation processing results for the plurality of unit subsequences. Afterwards, the aggregation processing results for the unit subsequences corresponding to a same subsequence are aggregated, so as to obtain an intermediate processing result corresponding to one subsequence.

S504: merging the intermediate processing results, so as to obtain an aggregation processing result for the target data sequence.

In an embodiment, by using a merging way, a plurality of intermediate processing results may be merged to finally obtain a total processing result, as the aggregation processing result for the target data sequence. Thus, aggregation processing for this complex target data sequence is completed.

In this embodiment, the specific merging way may be flexibly determined from specific business scenarios and user requirements. In particular, reference may be made to FIG. 6, the intermediate processing results "12", "23", "36" and "49" corresponding to 4 subsequences, are merged into one table, so as to obtain a Result0 as the final aggregation processing result. Thus, aggregation processing for the target data sequence Table 0 is completed.

In this embodiment, the specific merging way may be determined from the mode type for aggregation processing. By way of example, if the mode type for aggregation processing is summing, then the corresponding merging way may be adding the plurality of intermediate processing results. If the mode type for aggregation processing is averaging, then the corresponding merging way may be solving the geometric mean of the plurality of intermediate processing results, etc. The above specific merging way is not limited in this specification.

In this embodiment, a relatively complex target data sequence is split into a plurality of subsequences, which then can be subjected to simultaneous aggregation processing in a parallel processing mode, so as to obtain corresponding intermediate processing results. Subsequently, the intermediate processing results are merged to obtain an aggregation processing result for the target data sequence. Aggregation processing for the target data sequence is completed, thus solving the technical problems in the existing methods, such as low aggregation processing efficiency and prolonged processing procedure, by fully utilizing the processing performance of the server. The technical effects of increasing the aggregation processing efficiency, shortening the waiting time for users to query or access a database, and improving user experience are achieved.

In an embodiment, the above dividing the plurality of data elements in the target data sequence into a plurality of subsequence groups so as to obtain a plurality of subsequences, during specific implementation, may include: determining attribute flags for various data elements in the plurality of data elements; taking the attribute flags as grouping flags, and determining, based on the grouping flags for the data elements, subsequence groups corresponding respectively to various data elements in the plurality of data elements; and establishing corresponding subsequences according to the data elements contained in various subsequence groups.

In an embodiment, the method, during specific implementation, may also include: receiving, via a configuration port, mode configuration parameters for aggregation processing set by a user; and determining, based on the mode configuration parameters for aggregation processing, mode types for aggregation processing.

In an embodiment, the mode types for aggregation processing may in particular include at least one of: summing, averaging, minimizing, and maximizing, etc.

In an embodiment, after dividing the plurality of data elements in the target data sequence into a plurality of subsequence groups so as to obtain a plurality of subsequences, the method, during specific implementation, may further include: determining a number of data elements contained in various subsequences in the plurality of subsequences; and determining, based on the number of data elements contained in various subsequences in the plurality of subsequences, whether the subsequences in the plurality of subsequences need to be grouped.

In an embodiment, in case of determining, based on the number of data elements contained in various subsequences in the plurality of subsequences, that the subsequences in the plurality of subsequences need to be grouped, the method, during specific implementation, may further include: splitting the subsequences in the plurality of subsequences into a plurality of unit subsequences, respectively, by grouping the data elements contained in various subsequences in the plurality of subsequences.

Accordingly, performing parallel aggregation processing on the plurality of subsequences so as to obtain a plurality of intermediate processing results for the subsequences may in particular include: performing parallel aggregation processing on the plurality of unit subsequences, respectively, so as to obtain aggregation processing results for the unit subsequences; and aggregating the aggregation processing results for the unit subsequences corresponding to a same subsequence, so as to obtain an intermediate processing result for the subsequence.

In an embodiment, the method, during specific implementation, may further include: storing the plurality of subsequences on an on-chip memory.

In an embodiment, during specific implementation, in case that the storage space of the on-chip memory does not satisfy storage requirements, the plurality of subsequences may be stored on a DDR memory, or an SSD memory.

In an embodiment, the above acquiring a target data sequence in a database, during specific implementation, may include: receiving a data query request for the database made by a user; and acquiring, from the database, the target data sequence associated with the data query request according to the data query request.

In an embodiment, after merging the intermediate processing results so as to obtain an aggregation processing result for the target data sequence, the method, during specific implementation, may further include: sending, by the server, the resultant aggregation processing result for the target data sequence to a client device used by the user; and presenting, by the client device, the aggregation processing result to the user, to facilitate user's acquisition of information content the user wants to query.

It is thus clear from above that in the data aggregation processing method according to the embodiments of the present disclosure, a relatively complex target data sequence is split into a plurality of subsequences, which then can be subjected to simultaneous aggregation processing in a parallel processing mode, so as to obtain corresponding intermediate processing results. Subsequently, the intermediate processing results are merged to obtain an aggregation processing result for the target data sequence. Aggregation processing for the target data sequence is completed, thus solving the technical problems in the existing methods, such as low aggregation processing efficiency and prolonged processing procedure. The technical effects of increasing the aggregation processing efficiency, shortening the waiting time for users to query or access a database, and improving user experience are achieved. Furthermore, after the complex target data sequence is split into relatively simple subsequences, these subsequences are preferably cached on the on-chip memory, for facilitating subsequent reading and processing. As such, the efficiency of subsequence reading and processing is improved, while at the same time raising the overall aggregation processing efficiency for the target data sequence.

The embodiments of the present disclosure also provide a computer storage medium based on the above data aggregation processing method. The computer storage medium has computer program instructions stored thereon that, when executed, implement: acquiring a target data sequence in a database, wherein the target data sequence includes a plurality of data elements; dividing the plurality of data elements in the target data sequence into a plurality of subsequence groups, so as to obtain a plurality of subsequences; performing parallel aggregation processing on the plurality of subsequences, so as to obtain a plurality of intermediate processing results for the subsequences; and merging the intermediate processing results, so as to obtain an aggregation processing result for the target data sequence.

In this embodiment, the above-described storage medium includes, but not limited to Random Access Memory (RAM), Read-Only Memory (ROM), Cache, Hard Disk Drive (HDD) or Memory Card. The memory may be configured to store the computer program instructions. A network communication unit may be an interface for network connection communication, which is set in accordance with standards as prescribed in communication protocols.

In this embodiment, the functions and effects that are implemented by the program instructions stored on the computer storage medium may be explained as compared to other implementations, and a detailed description thereof is not given here.

In a specific implementation scenario example, the data aggregation processing method according to the embodiments of the present application may be applied to aggregation processing for a data sequence in a database. For the specific implementation procedure, reference may be made to the followings.

Step 1: sequence grouping. Aggregation operations in the database are based on grouping. Initially, the sequence (i.e. the target data sequence in the database) may typically be grouped, so as to obtain grouping flags corresponding to various data elements in the data sequence. Then, the original data sequence is divided into different subsequences according to the grouping flags. As such, the subsequence aggregation operations may be performed with respect to different subsequences.

Step 2: further subsequence grouping. Following the subsequence division in Step 1, these different subsequences may be subjected to aggregation operations (i.e., aggregation processing), respectively. In many cases, however, the amount of data in every subsequence is still so large that serial processing for a single subsequence is too slow. Hence, at particular intervals, these subsequences may be further sequentially divided into smaller subsequences (i.e., unit subsequences).

Step 3: subsequence aggregation. The subsequences resulting from the divisions in Step 1 and Step 2 are subjected to aggregation operations, respectively. For purposes of high-efficiency processing, these subsequences may be mapped into different aggregation processing units, respectively, for parallel processing.

Step 4: merging of the results. By means of the operation in Step 2, the data sequences in the same group are divided into a plurality of subsequences for processing purposes. In Step 3, intermediate results are obtained upon completion of the respective aggregation operations on the various subsequences. In this step, these intermediate results in the same group may be merged to obtain a final result.

In this scenario example, depending on the type of aggregation operation (i.e., the mode type for aggregation processing), there are different corresponding merging ways. For example, for a summing operation, the corresponding merging operation is adding a plurality of intermediate results; for maximizing/minimizing operations, the merging operation is maximizing/minimizing a plurality of intermediate results; and for an averaging operation, the merging operation is solving the geometric mean of a plurality of intermediate processing results.

Figure 7:
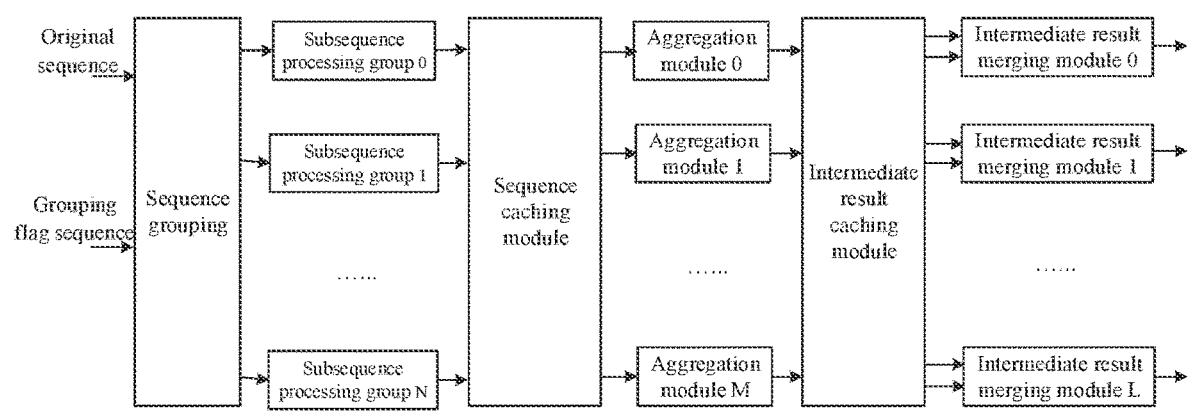
FIG. 7 is a schematic diagram of an embodiment in which the data aggregation processing method according to the embodiments of the present disclosure is applied in a scenario example.

In this scenario example, to implement the above method, a server may be utilized to construct the following program implementation modules based on processing logics. In particular, reference may be made to FIG. 7. These program implementation modules may specifically include: sequence grouping module, subsequence processing grouping module, sequence caching module, aggregation module group, intermediate result caching module, and intermediate result merging module group.

Among these modules, the sequence grouping module is, in particular, configured to receive sequence data (i.e., a target data sequence) that is input from the outside or input from an on-chip cache. The sequence is grouped according to the previously obtained data grouping flags. The grouped sequences are sequentially allocated to subsequence processing grouping module 0, subsequence processing grouping module 1, and subsequence processing grouping module N for grouping. If allocation to subsequence processing grouping module N is reached and the input sequences have not yet been completely grouped, then wait until grouping of the previous subsequences is completed, and proceed with the division from subsequence processing grouping module 0.

The subsequence processing grouping module group includes a plurality of subsequence processing grouping modules, with each module being specifically configured to further divide the input subsequence into a plurality of subsequences, at preset intervals.

The data of the subsequences that are obtained from the division by the subsequence processing grouping modules is stored in the sequence caching module before being subjected to aggregation operations. With the help of the on-chip sequence caching module, the data access efficiency may be enhanced and an improvement in overall system performance may be facilitated. When the space of the on-chip sequence caching module is completely unavailable, part of the data may be stored on an on-chip storage device, e.g., storage devices such as larger DDR or SSD.

The aggregation module group includes a plurality of aggregation modules that perform aggregation operations respectively on the various subsequences in the on-chip sequence caching module. Extremely high performances can be attained since the plurality of aggregation modules work in parallel.

Further, reference may be made to FIG. 4 for the structure of the above aggregation module, which is normally composed of several fundamental logic operation units, including an adding unit, a dividing unit, a comparing unit, etc. The plurality of fundamental logic operation units may be combined with each other to achieve summing, averaging, maximizing/minimizing operations or the like. During specific implementation, mode configuration parameters may be acquired via a configuration port, and the above fundamental logic operation units may be selected and utilized, according to these mode configuration parameters, to achieve different working modes for aggregation operations.

The data of the intermediate results processed by the aggregation modules is stored in the intermediate result caching module before being subjected to aggregation operations. Meanwhile, the intermediate results subsequently processed by the intermediate result merging module may also continue to be temporarily stored in the intermediate result caching module. With the help of the on-chip intermediate result caching module, the data access efficiency may be enhanced and an improvement in overall system performance may be facilitated. When the space of the on-chip sequence caching module is completely unavailable, part of the data may be stored on an on-chip storage device, e.g., storage devices such as larger DDR or SSD.

The intermediate result merging module group includes a plurality of intermediate result merging modules, with each module being capable of merging two intermediate results and outputting the combined result. Parallel working of the plurality of intermediate result merging modules could result in high-efficiency merging of a plurality of intermediate results.

In this scenario example, during specific implementation, based upon the above-mentioned method, specific aggregation operations may be performed on the sequence, as shown in FIG. 6, in the database through the above server.

What is shown in FIG. 6 specifically involves a sequence Table0 containing 16 data elements, as well as a grouping indication sequence Indicator0 corresponding thereto. Multiple consecutive 1s in the column Group of the indication sequence represent that these data elements belong to a same group, and 0 represents partitioning among different groups. The column Order represents serial numbers (i.e., numbers) for corresponding data elements in the original data sequence Table0.

By executing the above method through the above server, the sequence grouping module is utilized to group the original input data sequence according to a grouping identification sequence, so as to obtain four subsequences: Table0_0, Table0_1, Table0_2, and Table0_3.

The above four subsequences that result from the division are then respectively allocated to four different subsequence processing grouping modules, and are further divided into 8 subsequences: Table0_0_0, Table0_0_1, Table0_1_0, Table0_1_1, Table0_2_0, Table0_2_1, Table0_3_0, and Table0_3_1. Afterwards, the above various subsequences that result from the division are temporarily stored in the sequence caching module.

Next, the above various subsequences may be respectively allocated to different aggregation modules, and in accordance with configuration parameters, these aggregation modules are configured to work in a summing mode. The 8 subsequences are subjected to aggregation operations in parallel, so as to obtain intermediate results, which are temporarily stored in the on-chip intermediate result caching module.

Finally, the first two intermediate results 4 and 8 may be allocated to one intermediate result merging module, and then subjected to a summing merging operation to obtain a final result 12. The intermediate results 10 and 13 are allocated to one intermediate result merging module, and then subjected to a summing merging operation to obtain a final result 23. By analogy, merging of the remaining four other intermediate results is completed to obtain final results 36 and 49. In the end, the above four results are combined into a table Result0 that serves as the final result of aggregation operations for the original data sequence. Thus, aggregation operations for this data sequence are completed.

Through the scenario example described hereinabove, the data aggregation processing method according to the embodiments of the present application has been verified. A relatively complex target data sequence is split into a plurality of subsequences, which then can be subjected to simultaneous aggregation processing in a parallel processing mode, so as to obtain corresponding intermediate processing results. Subsequently, the intermediate processing results are merged to obtain an aggregation processing result for the target data sequence. Aggregation processing for the target data sequence is completed, thus indeed solving the technical problems in the existing methods, such as low aggregation processing efficiency and prolonged processing procedure. The technical effects of increasing the aggregation processing efficiency, shortening the waiting time for users to query or access a database, and improving user experience are achieved.

Even though this specification provides the method operation steps as described in the embodiments or flowchart, based on conventional or non-creative means, more or fewer operation steps may be included. The step sequence listed in the embodiments is merely one of the various sequences of step execution, and does not represent the only sequence of execution. During actual execution of the apparatus or client product, sequential execution or parallel execution is possible in accordance with the methods shown in the embodiments or accompanying drawings (e.g., in a parallel processor or a multithread processing environment, even in a distributed data processing environment). The term "include", "comprise" or any other variations thereof are intended to cover non-exclusive inclusion, so that a process, method, product or device including a series of elements includes not only those elements, but also other elements that are not clearly listed, or further includes inherent elements of this process, method, product or device. In case of no more limitations, such a case is not excluded where additional identical or equivalent elements are present in the process, method, product or device including said elements. Terms such as first and second are used to denote names, rather than any particular sequence.

Those skilled in the art also know that in addition to implementing a controller in a pure computer-readable program code manner, it is completely possible to program the method steps in a logical way, such that the controller implements the same function in the form of logic gates, switches, application-specific integrated circuits, programmable logic controllers, embedded microcontrollers and the like. Therefore, such a controller can be regarded as a hardware component, and the apparatuses included therein for implementing various functions can also be regarded as a structure inside the hardware component. Or even, the apparatus for implementing various functions can be regarded as both a software module for implementing the method and a structure inside the hardware component.

This specification may be described in the general context of computer-executable instructions executed by a computer, such as program modules. Generally, the program modules include routines, programs, objects, components, data structures, classes, etc. that perform specific tasks or implement specific abstract data types. This specification may also be practiced in distributed computing environments. In these distributed computing environments, tasks are performed by remote processing devices connected through a communication network. In the distributed computing environments, the program modules may be located in local and remote computer storage media including storage devices.

As can be seen from the above description of the embodiments, those skilled in the art can clearly understand that this specification can be implemented by means of software plus a necessary common hardware platform. Based on such understanding, the technical solutions of this specification can essentially be embodied in the form of a software product, this computer software product can be stored in a storage medium such as ROM/RAM, magnetic disk, optical disk, etc., including several instructions to cause a computer device (which can be a personal computer, a mobile terminal, a server, or a network device, etc.) to execute the method described in various embodiments or some sections of the embodiments in this specification.

The various embodiments in this specification are all described in a progressive manner, the identical or similar parts among the various embodiments can be referred to each other, and each embodiment focuses on its differences from other embodiments. This specification can be used in many general-purpose or special-purpose computer system environments or configurations. For example: personal computers, server computers, handheld devices or portable devices, tablet devices, multi-processor systems, microprocessor-based systems, set-top boxes, programmable electronic devices, network PCs, small computers, mainframe computers, distributed computing environments including any of the above systems or devices, etc.

Although this specification has been described through the embodiments, those of ordinary skill in the art know that there are many variations and changes in this specification without departing from the spirit of this specification, and it is intended that the appended claims include these variations and changes without departing from the spirit of this specification.

What is claimed is:

1. A data aggregation processing apparatus, comprising a sequence grouping module, an aggregation module group, and a merging module, wherein the sequence grouping module is connected with the aggregation module group, and the merging module is connected with the aggregation module group;
    the sequence grouping module is configured to divide a target data sequence in an accessed database into a plurality of subsequence groups based on attribute flags for various data elements in the target data sequence, so as to obtain a plurality of subsequences; wherein the target data sequence comprises a plurality of data elements;
    the aggregation module group comprises a plurality of parallel aggregation modules, the aggregation module group is configured to acquire the plurality of subsequences, and perform parallel aggregation processing on the plurality of subsequences through the plurality of parallel aggregation modules, so as to obtain corresponding intermediate processing results for the plurality of subsequences;
    the merging module is configured to merge the intermediate processing results, so as to obtain an aggregation processing result for the target data sequence;
    wherein a subsequence caching module is further connected between the aggregation module group and the sequence grouping module, and the subsequence caching module is configured to cache the plurality of subsequences; and
    wherein the subsequence caching module comprises an on-chip memory, and the subsequence caching module caches the plurality of subsequences in the on-chip memory.

2. The apparatus according to claim 1, wherein the subsequence caching module further comprises a DDR memory and/or an SSD memory, and in case that the storage space of the on-chip memory does not satisfy storage requirements, the subsequence caching module caches the plurality of subsequences in the DDR memory and/or the SSD memory.

3. The apparatus according to claim 1, wherein an intermediate processing result caching module is further connected between the merging module and the aggregation module group, and the intermediate processing result caching module is configured to cache a plurality of intermediate processing results.

4. The apparatus according to claim 3, wherein the intermediate processing result caching module comprises an on-chip memory, and the intermediate processing result caching module is configured to cache the plurality of intermediate processing results in the on-chip memory.

5. The apparatus according to claim 1, wherein a subsequence grouping module group is further connected between the aggregation module group and the sequence grouping module, wherein the subsequence grouping module group comprises a plurality of subsequence grouping modules, the plurality of subsequence grouping modules are configured to group the data elements contained in various subsequences in the plurality of subsequences, and split the subsequences in the plurality of subsequences into a plurality of unit subsequences, respectively.

6. The apparatus according to claim 1, wherein the aggregation module comprises a plurality of logic operation units, and the plurality of logic operation units comprise at least one of: an adding unit, a dividing unit, and a comparing unit.

7. The apparatus according to claim 6, wherein the apparatus further comprises a configuration port, which is connected with the aggregation modules in the aggregation module group and configured to receive mode configuration parameters for aggregation processing set by a user.

8. The apparatus according to claim 7, wherein the module is configured to combine the plurality of logic operation units according to the mode configuration parameters, in order to perform aggregation processing of corresponding mode types on the subsequences.

9. The apparatus according to claim 8, wherein the mode types for aggregation processing comprise at least one of: summing, averaging, minimizing, and maximizing.

10. A data aggregation processing method, comprising:
    acquiring a target data sequence in a database, wherein the target data sequence comprises a plurality of data elements;
dividing the plurality of data elements in the target data sequence into a plurality of subsequence groups based on attribute flags for various data elements in the target data sequence, so as to obtain a plurality of subsequences;
    storing the plurality of subsequences on an on-chip memory;
    performing parallel aggregation processing on the plurality of subsequences, so as to obtain a plurality of intermediate processing results for the subsequences; and
    merging the intermediate processing results, so as to obtain an aggregation processing result for the target data sequence.

11. The method according to claim 10, wherein dividing the plurality of data elements in the target data sequence into a plurality of subsequence groups so as to obtain a plurality of subsequences comprises:
    determining attribute flags for various data elements in the plurality of data elements;
    taking the attribute flags as grouping flags, and determining, based on the grouping flags for the data elements, subsequence groups corresponding respectively to various data elements in the plurality of data elements; and
    establishing corresponding subsequences according to the data elements contained in various subsequence groups.

12. The method according to claim 10, wherein the method further comprises:
- receiving, via a configuration port, mode configuration parameters for aggregation processing set by a user; and
- determining, based on the mode configuration parameters for aggregation processing, mode types for aggregation processing.

13. The method according to claim 12, wherein the mode types for aggregation processing comprise at least one of: summing, averaging, minimizing, and maximizing.

14. The method according to claim 10, wherein the method, after dividing the plurality of data elements in the target data sequence into a plurality of subsequence groups so as to obtain a plurality of subsequences, further comprises:
- determining a number of data elements contained in various subsequences in the plurality of subsequences; and
- determining, based on the number of data elements contained in various subsequences in the plurality of subsequences, whether the subsequences in the plurality of subsequences need to be grouped.

15. The method according to claim 14, wherein the method, in case of determining, based on the number of data elements contained in various subsequences in the plurality of subsequences, that the subsequences in the plurality of subsequences need to be grouped, further comprises:
- splitting the subsequences in the plurality of subsequences into a plurality of unit subsequences, respectively, by grouping the data elements contained in various subsequences in the plurality of subsequences;
- and accordingly, performing parallel aggregation processing on the plurality of subsequences so as to obtain a plurality of intermediate processing results for the subsequences comprises:
  - performing parallel aggregation processing on the plurality of unit subsequences, respectively, so as to obtain aggregation processing results for the unit subsequences; and
  - aggregating the aggregation processing results for the unit subsequences corresponding to a same subsequence, so as to obtain an intermediate processing result for the subsequence.

16. The method according to claim 10, wherein in case that the storage space of the on-chip memory does not satisfy storage requirements, the plurality of subsequences are stored on a DDR memory, or an SSD memory.

17. The method according to claim 10, wherein acquiring a target data sequence in a database comprises:
- receiving a data query request for the database made by a user; and
- acquiring, from the database, the target data sequence associated with the data query request according to the data query request.

18. The apparatus according to claim 1, wherein the sequence grouping module obtains a plurality of subsequences comprising:
- determining attribute flags for various data elements in the plurality of data elements;
- taking the attribute flags as grouping flags, and determining, based on the grouping flags for the data elements, subsequence groups corresponding respectively to various data elements in the plurality of data elements; and
- establishing corresponding subsequences according to the data elements contained in various subsequence groups.

* * * * *